W. F. STIMPSON.
COMPUTING SCALE.
APPLICATION FILED AUG. 28, 1915.

1,392,976.

Patented Oct. 11, 1921.
4 SHEETS—SHEET 1.

Inventor
Walter F. Stimpson

By [signature]

Attorneys

W. F. STIMPSON.
COMPUTING SCALE.
APPLICATION FILED AUG. 28, 1915.
1,392,976.
Patented Oct. 11, 1921.
4 SHEETS—SHEET 2.
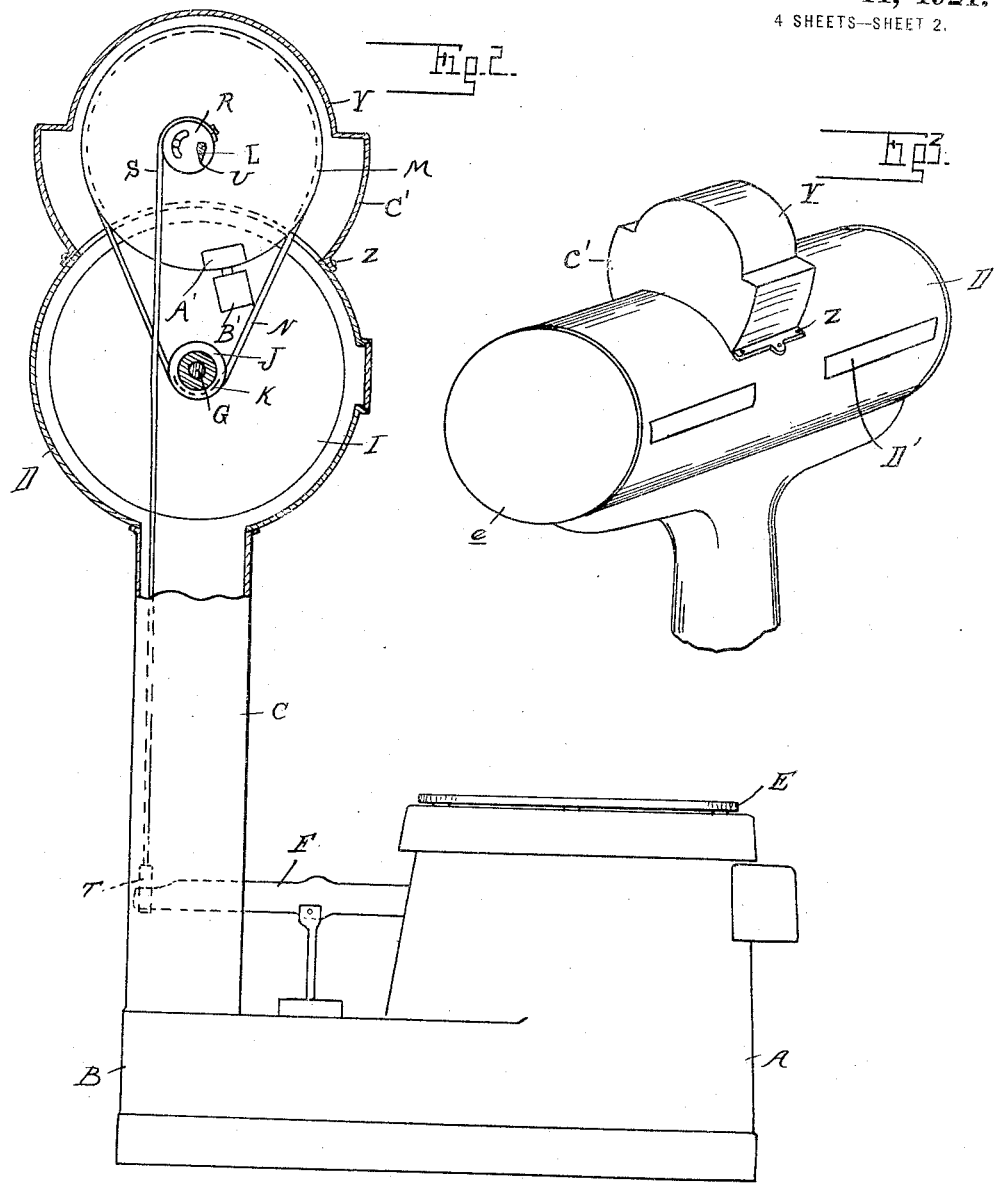
Inventor
Walter F. Stimpson
By
Attorneys W. F. STIMPSON.
COMPUTING SCALE.
APPLICATION FILED AUG. 28, 1915.
1,392,976.
Patented Oct. 11, 1921.
4 SHEETS—SHEET 3.
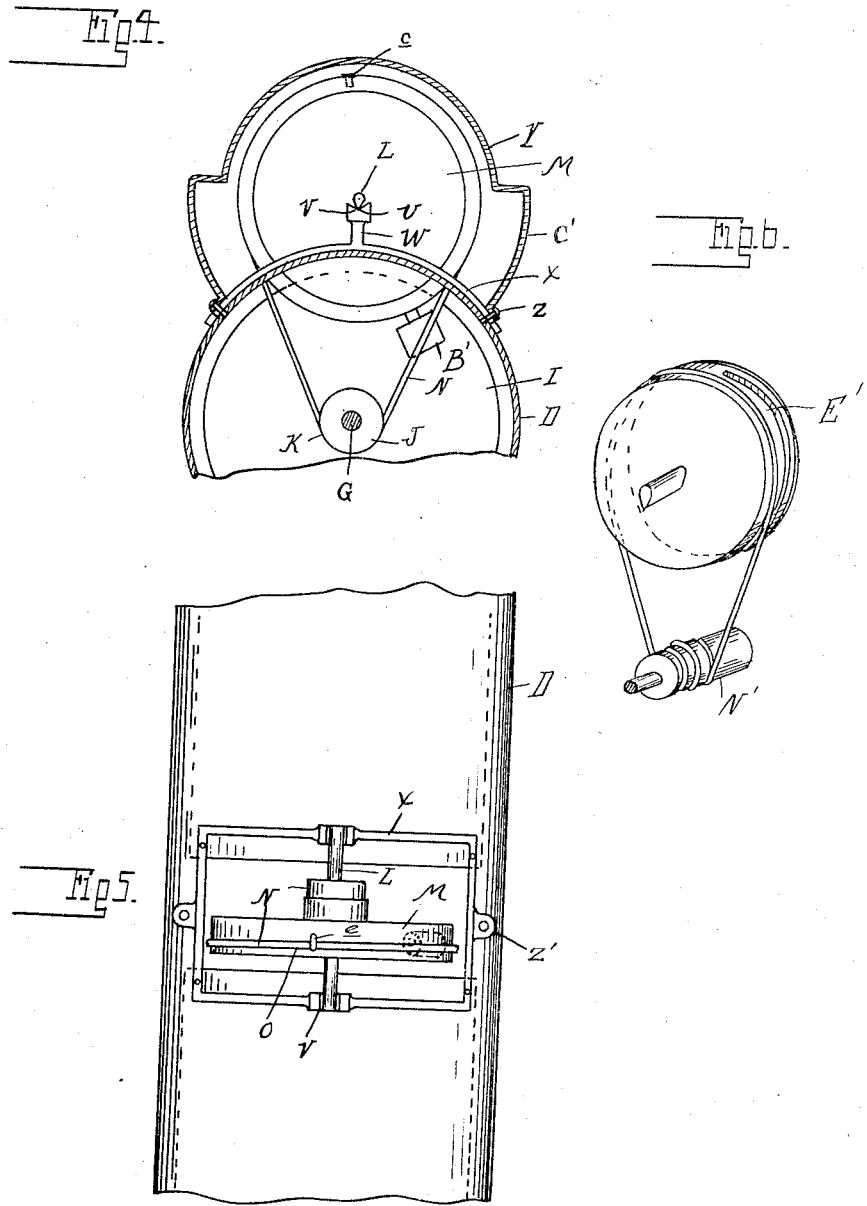

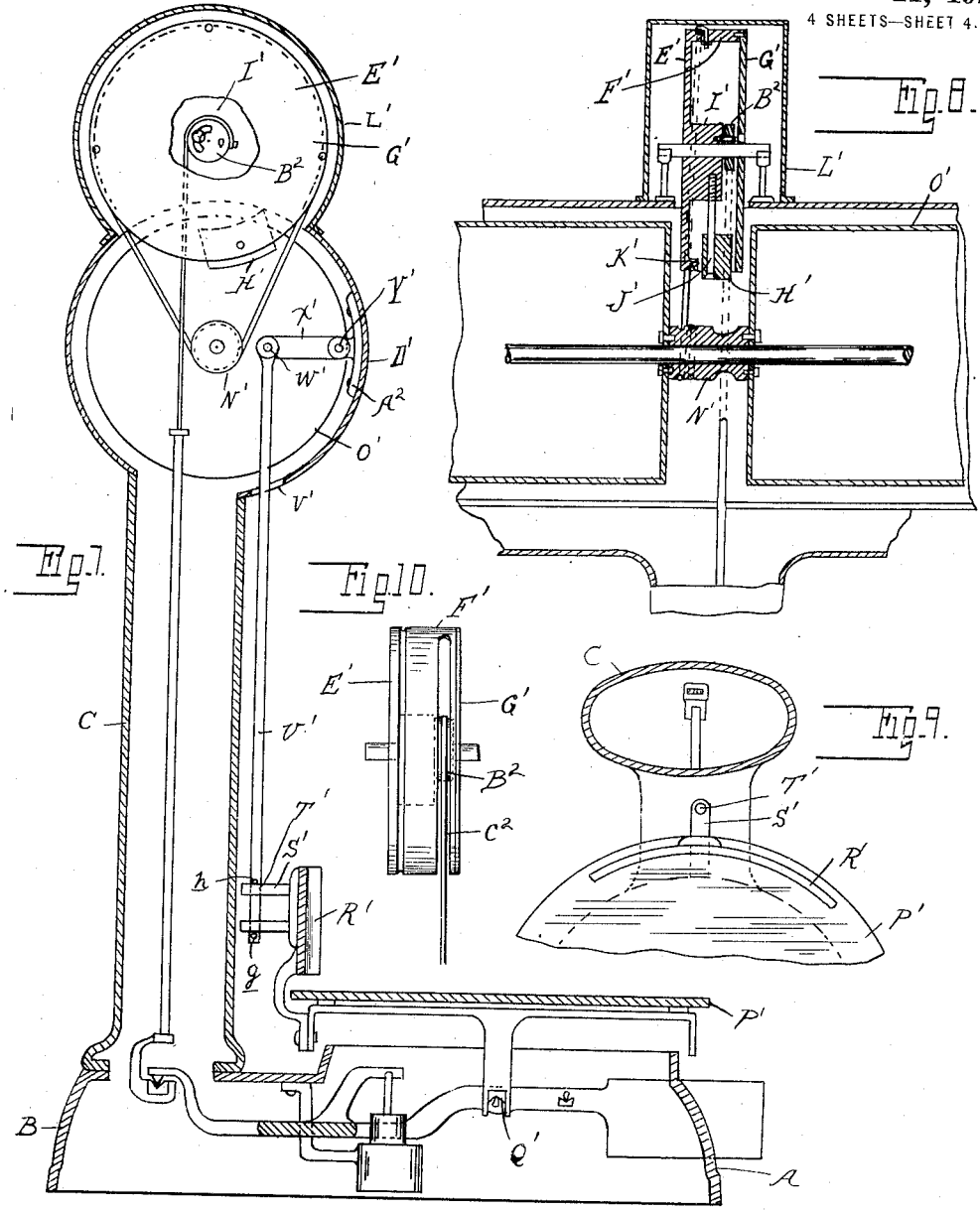

500 # UNITED STATES PATENT OFFICE.

WALTER F. STIMPSON, OF DETROIT, MICHIGAN.

COMPUTING-SCALE.

1,392,976.

Specification of Letters Patent.    Patented Oct. 11, 1921.

Application filed August 28, 1915. Serial No. 47,741.

*To all whom it may concern:*

Be it known that I, WALTER F. STIMPSON, a citizen of the United States of America, residing at Detroit, in the county of Wayne and State of Michigan, have invented certain new and useful Improvements in Computing-Scales, of which the following is a specification, reference being had therein to the accompanying drawings.

The invention relates to computing scales and resides in the novel construction of the indicating mechanism; in the novel connection between the indicating mechanism and the platform lever; in the novel construction and arrangement of the guide for the platform; and in certain details of construction, arrangements and combinations of parts as will more fully hereinafter appear.

In the drawings,—

Fig. 2 is a sectional side elevation;

Fig. 3 is a perspective view of the casing for the indicating mechanism;

Fig. 4 is a section on the line $x$—$x$ of Fig. 1;

Fig. 5 is a fragmentary top plan view of the casing for the indicating mechanism, with certain parts removed;

Fig. 6 is a perspective view illustrating a part of the actuating mechanism for the indicator; and Figs. 7, 8, 9 and 10 illustrate a modified construction.

Figure 1:
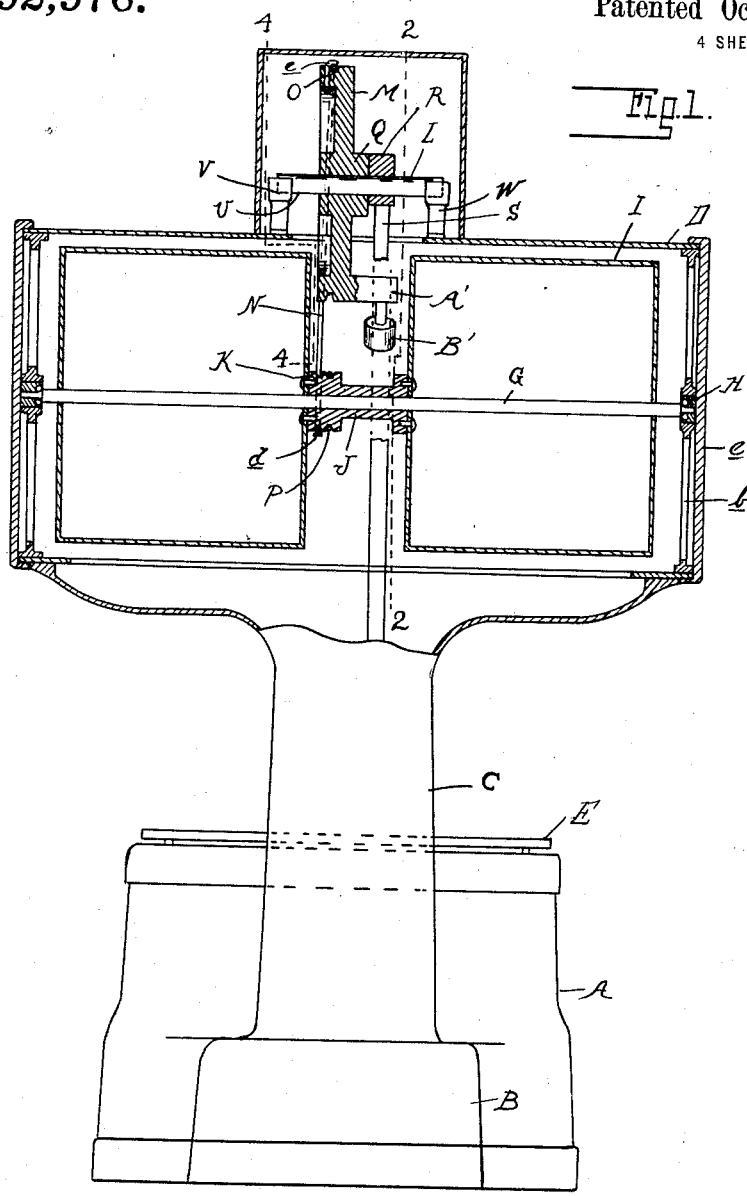
Figure 1 is a sectional front elevation of a scale embodying the invention.

To have an accurate and sensitive scale it is necessary to have the connections for actuating the indicator such as to eliminate, as far as possible, the element of friction. With my improved construction I reduce to a minimum the element of friction and the actuation of the indicator, and have the connection between the platform levers and the indicating mechanism such as to cause the movements of the platform levers to be accurately transmitted to the indicating mechanism.

Referring to the one embodiment of the invention shown in Figs. 1 to 5 inclusive of the drawings, A designates the scale base having a lateral projection B upon which is mounted a hollow standard C that carries at its upper end a cylindrical housing D. E is the platform supported in any usual manner upon the platform levers, and F is an extension of the platform levers projecting within the hollow standard C. Mounted upon a shaft G that is journaled in anti-friction bearings H is a spider $b$ in the ends of the casing D is a drum or cylinder I, the drum being herein shown as formed of two sections. Arranged between the two sections is a sleeve J carrying a pulley K, the latter being shown as formed integral with the sleeve J. Fixed to rotate with a shaft L is a second pulley M which is connected to the pulley K preferably by means of an endless cable N. The pulley M is provided with a single annular groove O within which the cable is arranged, but the pulley K has a spiral groove P in the periphery thereof, the spiral groove being of a length to extend twice around the pulley and the cable N is wrapped once around the pulley K. The cable is secured at $c$ to the pulley M and is secured to the pulley K at $d$. The connection $c$ is in the form of a bolt having a laterally-extending head for clamping over the cable. By loosening the bolt the pulley M may be adjusted in relation to the cable. This prevents slipping of the cable on the pulleys.

The casing D preferably is provided with removable ends $e$ and one of the spiders is made removable so as to permit the drum to be disengaged from the casing D or readily inserted therein.

Connected to the hub Q of the pulley M is the eccentric R for the strap S. This strap extends downwardly and is provided with a stirrup T within which the forward end of the extension F of the platform lever is arranged. As shown the shaft L is provided with a knife-edge U which pivotally engages bearings V carried by brackets W. The brackets W are arranged without the casing D and in the particular structure illustrated are formed integral with a segmental casting X that is arranged upon the top of the casing D. Between the brackets L the top of the casing D is cut away to allow the lower edge of the pulley M to extend within the casing D, as will be noted upon reference to Fig. 4. Inclosing the pulley M is a housing Y that is secured to the casting X as by means of bolts Z. Z' are ears on the casting X which are secured to the casing D by means of screws or bolts. Connected to a laterally-extending flange A' of the pulley M is the pendulum weight B', and in order to provide clearance for the pendulum weight the housing Y has enlarged laterally-extending portions C' at opposite sides thereof. Arranged upon the sections of the drum I are the usual indications which are adapted to be brought into registration with the sight opening D' in the casing D.

With the construction so far described, when weight is applied to the platform the platform levers will act upon the strap S of the eccentric R to rotate the pulley M and rotation of the pulley M will be transmitted to the drum I through the medium of the cable M and pulley K. This will bring the proper indications into registration with the sight opening D, as will be readily understood. When the weight is removed from the platform the parts will be returned to their normal position and the drum I will also be positively returned.

Since the drum I is journaled in antifriction bearings, and as it may be made exceedingly light, no appreciable force is required to turn the drum in either direction. Furthermore, the drum is of course a balanced member. Also preferably the pulleys M and N are balanced members. By arranging the axis of the pulley M parallel with the axis of the drum I a very simple connection is permitted between the eccentric or other actuating mechanism and the drum.

In the construction shown in Figs. 6 and 7 the pulley E' is formed with a laterally-extending annular flange F', to the outer edge of which is attached a cover G'. The pendulum weight H' is connected to the hub I' of the pulley E' by means of a bolt or screw J' and the flange F' is cut away at K' to receive the pendulum weight H'. The eccentric B² for the pulley E' is arranged within the cover G' and the flange F' is cut away as indicated at C² to provide passage for the strap of the eccentric. The arrangement is such that at its extreme outward movement the pendulum weight is nearly flush with the periphery of the pulley E', which eliminates the necessity for lateral extensions of the housing L' to provide clearance for the pendulum weight. The pulley E' is connected to the pulley N' of the drum O' in the same manner as described in connection with the structure shown in Figs. 1 and 2. Preferably also the drum and the two pulleys are balanced.

It is desirable in some instances to provide a low base and when a low base is employed it is quite desirable to have a guide for the platform. In Figs. 6 and 8 I have shown a low base scale in which the platform P' is fulcrumed at Q' upon the platform levers, in the usual manner. Connected to the platform is a guard R', herein shown as of segmental form, and attached to the guard are laterally-extending arms S' provided with apertures or bearings T' for receiving the lower end of a check-rod U'. g and h are pins for securing the rod in the bearings T. The upper end of this rod extends through an opening V' in the casing D and is pivotally connected at W' to a link X' that is fulcrumed at Y' upon a suitable bearing A² connected to the casing D'. By my improved connection between the drum and the actuating mechanism therefor, a space is left between the two sections of the drum, which provides room for the upper end of the rod U' and the connections therefor. The guide for the platform operates in a well-known manner. When it is desired to detach the platform the pin g is removed. The rod U' may then be lifted out of the bearings T'.

What I claim as my invention is:—

1. In a scale, the combination of an indicator including a pivoted member, a second pivoted member, the axes of said members being parallel and extending in the same direction, and flexible connections between said pivoted members for effecting a positive actuation of the pivoted indicating member by the movement of the second pivoted member in either direction.

2. In a scale, the combination of a pivoted indicating cylinder, a pivoted actuating member, the axes of the cylinder and pivoted member being parallel and extending in the same direction, a bearing connected to the cylinder to turn therewith, and a flexible connection between said bearing and said pivoted member adapted by the actuation of the pivoted member in either direction to effect a positive turning of the cylinder in such direction.

3. In a scale, the combination of a pivoted indicating drum, a pulley connected thereto, a second pulley, the axes of said pulleys extending in the same direction and being parallel, and a flexible connection between said pulleys for effecting an actuation of the drum by said flexible connection by a movement of the second pulley in either direction.

4. In a scale, the combination with a casing, a drum pivoted therein, a pulley having its axis parallel to the axis of the drum and extending in the same direction as the drum axis, a bearing carried by the drum, and a flexible connection extending around said pulley and operatively connected to the bearing upon opposite sides of the axis of the drum.

5. In a scale, the combination of a casing, a drum pivoted therein, a pulley having its axis coincident with the axis of the drum and secured to rotate therewith, a second pulley having its axis parallel to and extending in the same direction as the axis of the drum, and a flexible connection between said pulleys for effecting a positive turning of the drum by said connection upon the turning of the second pulley in either direction.

6. In a scale, the combination with a casing, a drum pivotally arranged therein, a pulley having its axis coincident with the axis of the drum and secured to rotate therewith, bearings mounted upon the exterior of said casing, a pulley journaled in said bearings having a portion extending within said casing, and a flexible connection between said pulleys for effecting a positive turning of the drum by said flexible connection upon the turning of said second pulley in either direction.

7. In a scale, the combination with a casing, a drum composed of spaced sections journaled in said casing, a pulley arranged between said spaced sections, bearings upon the exterior of said casing, a second pulley journaled in said bearings, and a flexible connection between said pulleys for effecting a positive turning of said drum sections by said flexible connection upon turning of the second pulley in either direction.

8. In a scale, the combination with a casing, a drum composed of spaced sections journaled in said casing, a pulley arranged between said spaced sections, bearings upon the exterior of said casing, a second pulley journaled in said bearings, a flexible connection between said pulleys for effecting a positive turning of said drum sections by said flexible connection upon turning of the second pulley in either direction, and a housing mounted upon said casing and inclosing said bearings and said second pulley.

9. In a scale, the combination of a casing, the platform levers, a platform on said levers, a guard attached to said platform, and a check-rod for said platform extending between said casing and guard and attached to the guard.

10. In a scale, the combination of a casing, the platform levers, a platform on said levers, a guard attached to said platform, a bearing carried by said guard, a check-rod engaging said bearing, and a connection between check-rod and said casing.

11. In a scale, the combination of a casing, the platform levers, a platform on said levers, a guard attached to said platform, a bearing carried by said guard, a check-rod engaging said bearing, a bracket connected to said casing, and a pivotal connection between said bracket and said check-rod.

12. In a scale, the combination of the base, a standard extending upwardly therefrom, a casing carried by said standard, an indicating drum in said casing, platform levers, a connection between said platform levers and said indicating drum, a platform mounted on said levers, said drum being formed of spaced sections, and a check-rod for said platform having one end operatively connected thereto and having the other end extending upwardly within said casing and positioned between the spaced sections of the drum, and a connection between said check-rod and the casing.

13. In a scale, the combination of a casing the platform levers, a platform on said levers, a guard on said platform, a check-rod, a connection between said check-rod and casing, and a detachable connection between the other end of said check-rod and said guard.

14. In a scale, the combination of a casing, platform, levers, a platform on said levers, a guard on said platform, a laterally-extending arm on said guard, a check-rod, a connection between said check-rod and casing, and a detachable connection between the other end of said check-rod and said laterally-extending arm.

15. In a scale, the combination with a weighing platform and a rotatable indicating member, of a rotatable actuating member above said indicating member, means for rotating said actuating member upon movement of said weighing platform and a flexible connection between said actuating and indicating members for effecting positive actuation of said indicating member upon rotation of said actuating member in either direction.

16. In a scale, the combination with a weighing platform, of a rotatable actuating member, mechanism for rotating said member from said weighing platform, a rotatable indicating member having its axis substantially parallel to that of said actuating member and a flexible connection between said actuating and indicating members for effecting positive actuation of said indicating member upon rotation of said actuating member in either direction.

17. In a scale, the combination with a weighing platform, of a rotatable actuating member, mechanism for rotating said member from said platform including a flexible member, a rotatable indicating member having its axis substantially parallel to that of said actuating member and a flexible connection between said actuating and indicating members for effecting a positive actuation of said indicating member upon rotation of said actuating member in either direction.

18. In a scale, the combination with a weighing platform and a rotatable indicating member including spaced alined drums, of a rotatable actuating member extending partially into the space between said drums, a cable connection between said actuating member and drums for effecting a positive rotation of said drums upon rotation of said actuating member in either direction and mechanism between said actuating member and weighing platform for rotating the former upon movement of the latter, said mechanism including a flexible connection.

19. In a scale, the combination with a weighing platform and a rotatable indicating member including spaced alined drums, of a rotatable actuating member above said indicating member, a flexible connection extending between said drums for rotating said indicating member from said actuating member in either direction, and means extending between said drums for rotating said actuating member from said weighing platform.

20. In a scale, the combination with a weighing platform and a rotatable indicating member having spaced alined drums, of a rotatable actuating member having its pivot above the pivot of said indicating member, a cable connection extending between said drums for effecting a positive rotation of said indicating member upon rotation of said actuating member in either direction, and mechanism extending between said drums for rotating said actuating member from said weighing platform, said mechanism including a flexible connection.

In testimony whereof I affix my signature in presence of two witnesses.

WALTER F. STIMPSON.

Witnesses:
  JAMES P. BARRY,
  PHYLLIS COBURN.